(12) United States Patent
Ogawa

(10) Patent No.: US 11,165,102 B2
(45) Date of Patent: Nov. 2, 2021

(54) POWER STORAGE DEVICE

(71) Applicant: Toyota Jidosha Kabushiki Kaisha, Toyota (JP)

(72) Inventor: Naohito Ogawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/005,725

(22) Filed: Aug. 28, 2020

(65) Prior Publication Data

US 2021/0151807 A1  May 20, 2021

(30) Foreign Application Priority Data

Nov. 14, 2019 (JP) .............................. JP2019-206469

(51) Int. Cl.
| | |
|---|---|
| *H01M 10/00* | (2006.01) |
| *H01M 10/42* | (2006.01) |
| *H01M 10/34* | (2006.01) |
| *H01M 50/691* | (2021.01) |

(52) U.S. Cl.
CPC ..... *H01M 10/4228* (2013.01); *H01M 10/345* (2013.01); *H01M 50/691* (2021.01); *H01M 2220/20* (2013.01)

(58) Field of Classification Search
CPC ........... H01M 10/345; H01M 10/4228; H01M 50/691; H01M 2220/20
See application file for complete search history.

(56) References Cited

U.S. PATENT DOCUMENTS

2019/0277793 A1*  9/2019  Elsentriecy ............ G01N 17/02

FOREIGN PATENT DOCUMENTS

JP  2019-121450 A  7/2019

* cited by examiner

*Primary Examiner* — Cynthia H Kelly
*Assistant Examiner* — Monique M Wills
(74) *Attorney, Agent, or Firm* — Dinsmore & Shohl LLP

(57) ABSTRACT

A power storage device includes: a power storage module in which an electrolytic solution is accommodated, the power storage module including a top face, a bottom face, and a plurality of side faces provided such that the side faces connect the top face to the bottom face; a liquid discharge valve provided on at least one of the side faces; a liquid collection unit configured to collect the electrolytic solution discharged from the liquid discharge valve; an accumulation portion in which the electrolytic solution collected by the liquid collection unit is accumulated; a corrosion portion configured to corrode due to the electrolytic solution; and a detection portion configured to detect breakage of the corrosion portion. The corrosion portion is placed in a passage route along which the electrolytic solution collected by the liquid collection unit reaches the accumulation portion.

8 Claims, 10 Drawing Sheets

POWER STORAGE DEVICE

CROSS-REFERENCE RELATED TO APPLICATIONS

This application claims priority to Japanese Patent Application No. 2019-206469 filed on Nov. 14, 2019, which is incorporated herein by reference in its entirety including the specification, drawings and abstract.

BACKGROUND

1. Technical Field

This disclosure relates to a power storage device.

2. Description of Related Art

Various power storage devices have been proposed in the related art as a power storage device in which an electrolytic solution is accommodated and a plurality of bipolar cells is laminated.

For example, a power storage device described in Japanese Unexamined Patent Application Publication No. 2019-121450 (JP 2019-121450 A) includes a plurality of bipolar cells, and a sealing body covering outer peripheral surfaces of the laminated bipolar cells.

SUMMARY

In the power storage device, the sealing body restrains an electrolytic solution from leaking outside. In the meantime, the electrolytic solution may not be completely sealed by the sealing body, and the electrolytic solution might leak out from a gap between the sealing body and the laminated bipolar cells.

Particularly, when an internal pressure of the bipolar cell increases, the sealing body may be damaged, so that a large part of the electrolytic solution might leak outside.

In view of this, it is considered that a liquid discharge valve is provided in the bipolar cell. The liquid discharge valve is opened when an internal pressure in the bipolar cell reaches a predetermined pressure or more. When the liquid discharge valve is opened, gas inside the bipolar cell is discharged outside, so that the internal pressure in the bipolar cell decreases. Hereby, it is possible to restrain the sealing body from being damaged and to restrain a large amount of the electrolytic solution from leaking due to damage of the sealing body. When the gas inside the bipolar cell is discharged outside through the liquid discharge valve, the electrolytic solution inside the bipolar cell also gushes out through the liquid discharge valve.

However, even if the liquid discharge valve is just provided, it is difficult for a vehicle to grasp whether the electrolytic solution leaks via the liquid discharge valve or not.

This disclosure is accomplished in view of the above problems, and an object of this disclosure is to provide a power storage device provided with a liquid discharge valve, the power storage device being able to detect leakage of an electrolytic solution through the liquid discharge valve.

A power storage device of this disclosure includes a power storage module, a liquid discharge valve, a liquid collection unit, an accumulation portion, a corrosion portion, and a detection portion. An electrolytic solution is accommodated in the power storage module. The power storage module includes a top face, a bottom face, and a plurality of side faces provided such that the side faces connect the top face to the bottom face. The liquid discharge valve is provided on at least one of the side faces. The liquid collection unit is configured to collect the electrolytic solution discharged from the liquid discharge valve. In the accumulation portion, the electrolytic solution collected by the liquid collection unit is accumulated. The corrosion portion is configured to at least partially corrode due to the electrolytic solution. The detection portion is configured to detect breakage of the corrosion portion. The corrosion portion is placed in a passage route along which the electrolytic solution collected by the liquid collection unit reaches the accumulation portion.

In the power storage device, when the electrolytic solution gushes out from the liquid discharge valve, the electrolytic solution is attached to the corrosion portion, so that the corrosion portion corrodes. When the corrosion portion breaks because of this, the detection portion detects the breakage of the corrosion portion. Thus, it is possible to detect that the electrolytic solution gushes out from the liquid discharge valve.

The power storage device may further include a holding portion configured to hold the corrosion portion. The holding portion may include a first holding part and a second holding part. The first holding part may be distanced from a corrosion part of the corrosion portion, the corrosion part being configured to corrode due to the electrolytic solution. The second holding part may be positioned on a side opposite to the first holding part across the corrosion part.

In the power storage device, when the corrosion portion breaks, a state where broken pieces are held by the holding portion is maintained, thereby making it possible to restrain the broken pieces from entering the accumulation portion. If the broken pieces enter the accumulation portion and the broken pieces are conductive with each other through the electrolytic solution in the accumulation portion, the detection portion cannot detect the breakage of the corrosion portion. In the meantime, with the above power storage device, it is possible to restrain such an adverse effect from occurring.

The accumulation portion may be placed below the liquid collection unit. The corrosion portion may be sandwiched between the accumulation portion and the liquid collection unit.

In the power storage device, the corrosion portion is sandwiched between the liquid collection unit and the accumulation portion. This makes it possible to restrain the broken pieces from entering the accumulation portion.

The power storage device may further include a tension device configured to pull the corrosion portion. The corrosion portion may include: a corrosion part configured to corrode due to the electrolytic solution; a first tension part positioned at a position distanced from the corrosion part; and a second tension part positioned on a side opposite to the first tension part across the corrosion part. The tension device may be configured to apply tensile forces to the corrosion portion so that the first tension part and the second tension part are separated from each other.

In the power storage device, when the corrosion portion breaks, the broken pieces are moved by the tension device so that the broken pieces are separated from each other. This makes it possible to restrain the broken pieces from entering the accumulation portion.

The accumulation portion may be placed below the liquid collection unit. The liquid collection unit may have a supply port via which the collected electrolytic solution is supplied to the accumulation portion. The accumulation portion may include a hollow projection portion projecting upward and having the supply port. The corrosion portion may be placed on the projection portion.

In the power storage device, when the corrosion portion breaks, broken end portions of the broken pieces are easily displaced upward. On this account, it is possible to restrain the broken pieces formed due to breakage of the corrosion portion from entering the accumulation portion.

The accumulation portion may be placed below the liquid collection unit. The liquid collection unit may have a supply port via which the collected electrolytic solution is supplied to the accumulation portion. The corrosion portion may be placed below the supply port. When the supply port and the corrosion portion are viewed from above the supply port, an area of a part of the corrosion portion, the part being positioned inside the supply port, may be smaller than an aperture area of the supply port.

In the power storage device, the area of the corrosion portion positioned inside the supply port is small. Accordingly, when the electrolytic solution flowing out from the supply port is attached to the corrosion portion, the corrosion portion easily breaks at a relatively early stage. This makes it possible to detect the leakage of the electrolytic solution at an early stage.

The accumulation portion may be placed below the liquid collection unit. The liquid collection unit may have a supply port via which the collected electrolytic solution is supplied to the accumulation portion. The liquid collection unit may include an inclined surface formed to be inclined such that the inclined surface is directed downward toward the supply port.

With the power storage device, the electrolytic solution can be easily guided to the supply port, thereby making it possible to appropriately supply the electrolytic solution entering the liquid collection unit to the accumulation portion.

The accumulation portion may have a receiving port positioned below the supply port, the receiving port being formed in a part of the accumulation portion, the part being configured to receive the electrolytic solution supplied from the supply port. An aperture area of the receiving port may be larger than an aperture area of the supply port.

With the power storage device, when the electrolytic solution flows into the receiving port from the supply port, it is possible to restrain the electrolytic solution from leaking outside.

With the power storage device according to this disclosure, the power storage device provided with the liquid discharge valve can detect leakage of the electrolytic solution through the liquid discharge valve.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to FIGS. 1 to 15, the following describes a power storage device according to the present embodiment. Among constituents illustrated in FIGS. 1 to 15, the same or substantially the same constituent has the same reference sign, and redundant descriptions are omitted.

Embodiment 1

Figure 1:
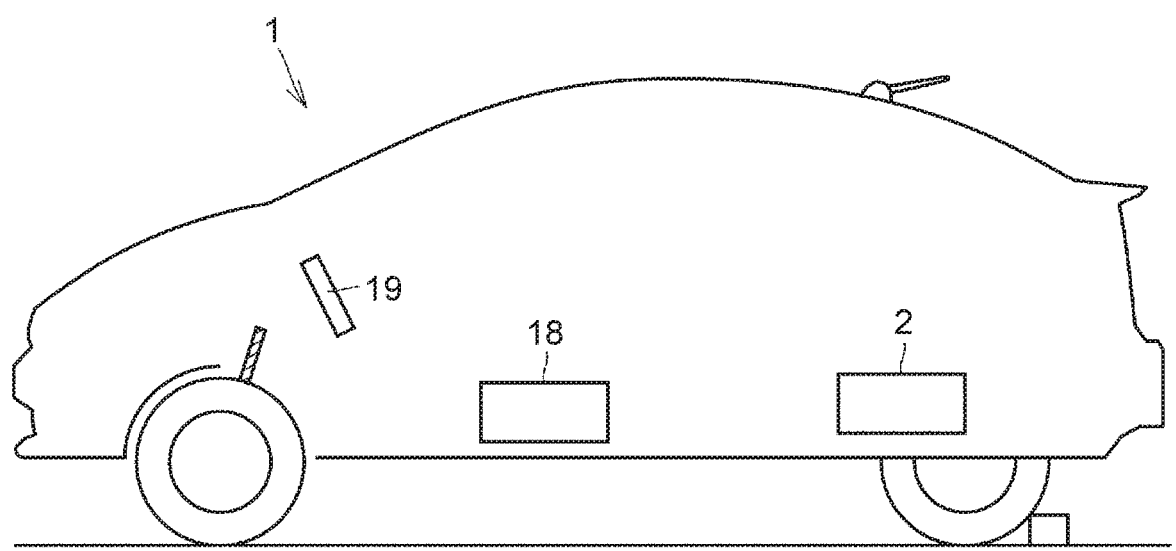
FIG. 1 is a schematic view schematically illustrating a vehicle 1 provided with a power storage device 2 according to Embodiment 1.

FIG. 1 is a schematic view schematically illustrating a vehicle 1 provided with a power storage device 2 according to Embodiment 1. As illustrated in FIG. 1, the vehicle 1 includes the power storage device 2, an ECU 18, and a notification portion 19. The ECU 18 controls a charge power upper limit (Win) and a discharge power upper limit (Wout) of the power storage device 2. The notification portion 19 includes, for example, a liquid crystal display portion such as a navigator and is a device configured to notify a driver and so on of various pieces of information.

Figure 2:
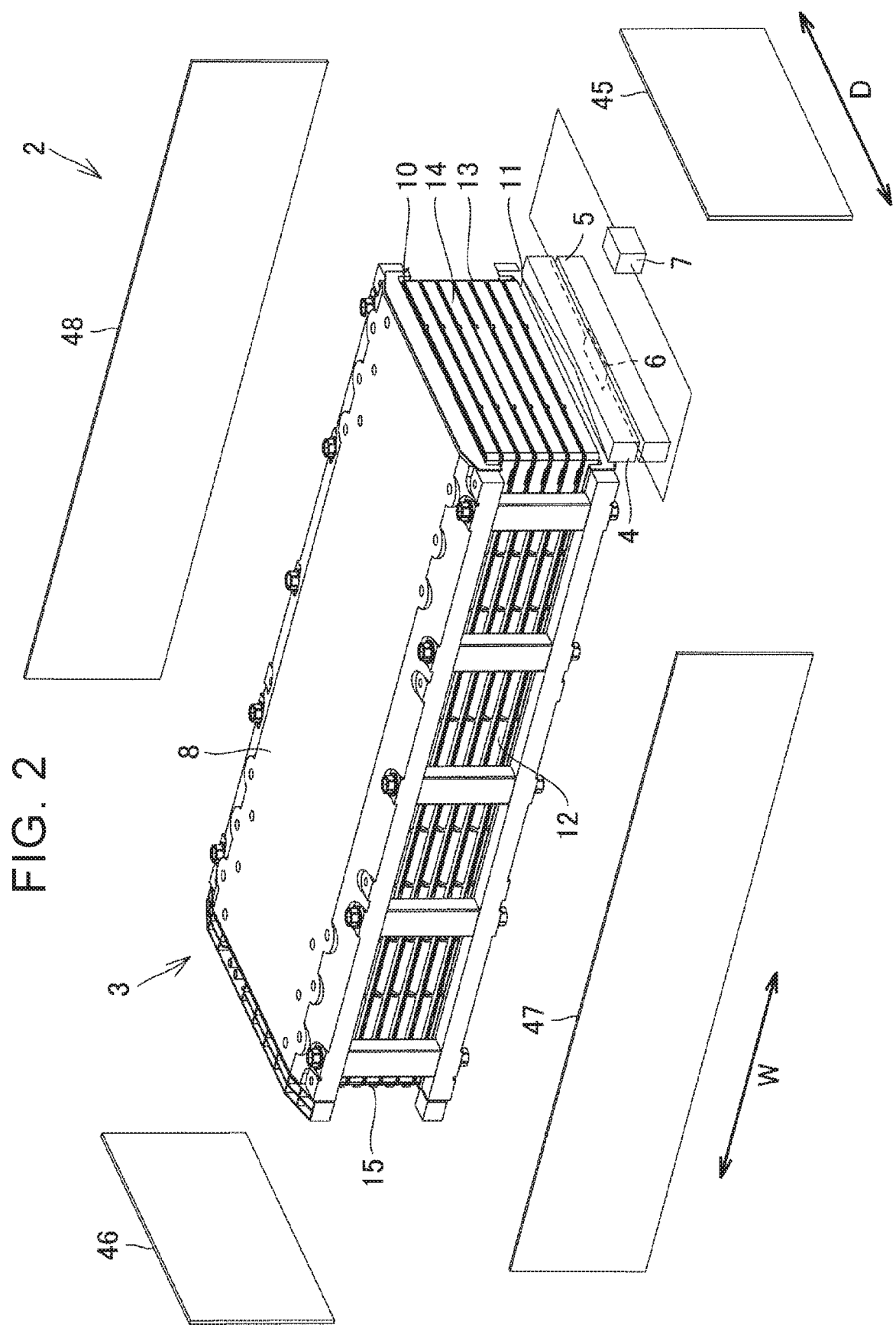
FIG. 2 is a perspective view schematically illustrating the power storage device 2.

FIG. 2 is a perspective view schematically illustrating the power storage device 2. The power storage device 2 includes a power storage module 3, a liquid collection unit 4, an accumulation portion 5, a corrosion portion 6, a detection portion 7, and a restraining tool 8.

The power storage module 3 is formed generally in a rectangular solid shape. The power storage module 3 includes a top face 10, a bottom face 11, long side faces 12, 13, and end side faces 14, 15.

Note that the long side faces 12, 13 and the end side faces 14, 15 are placed so as to connect the top face 10 to the bottom face 11.

The long side face 12 and the long side face 13 are formed in an elongated shape in a width direction W, and the long side face 12 and the long side face 13 are arranged in a front-rear direction D. The end side face 14 and the end side face 15 are formed to extend in the front-rear direction D, and the end side face 14 and the end side face 15 are placed to be arranged in the width direction W.

Figure 3:
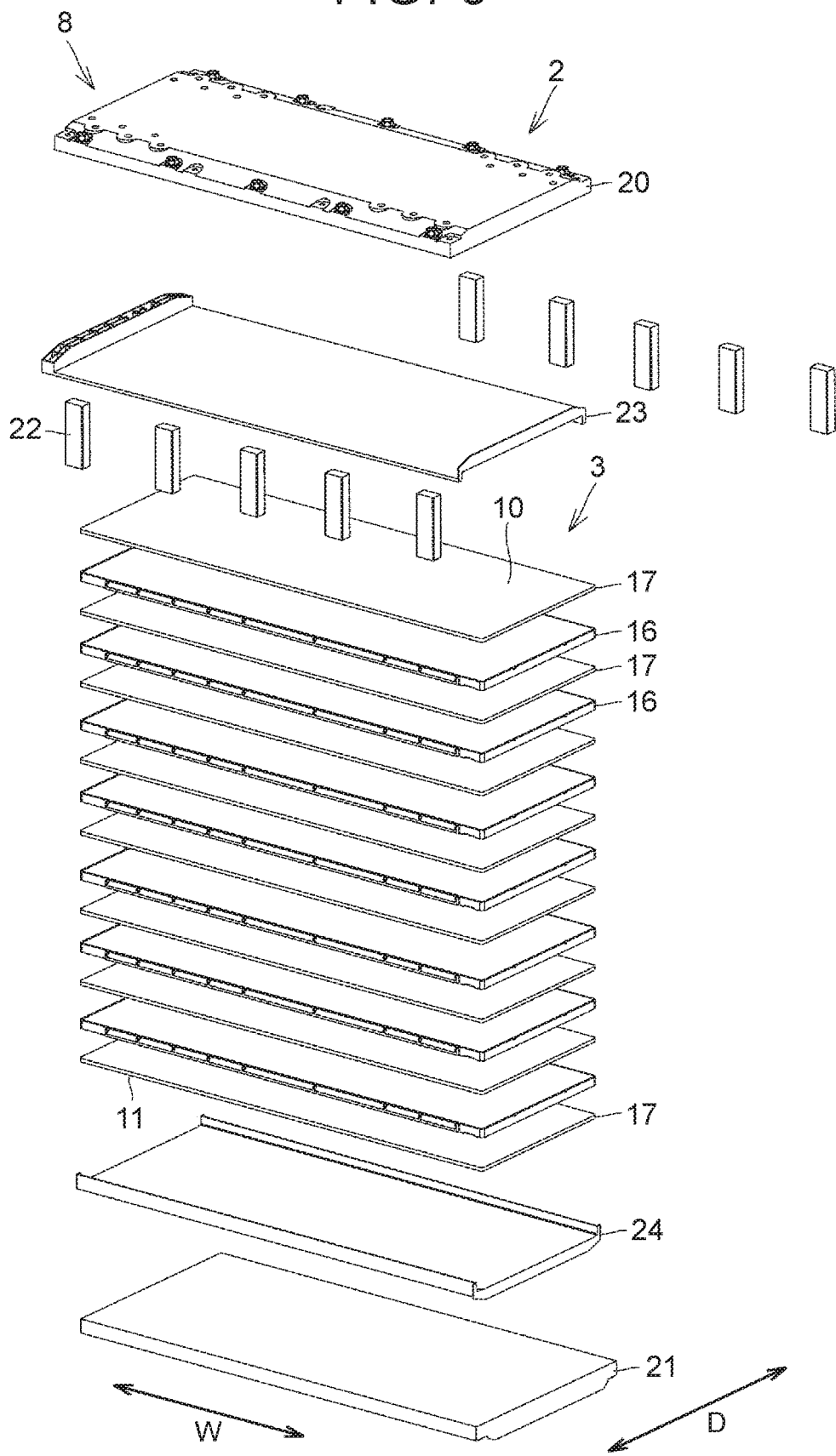
FIG. 3 is an exploded perspective view illustrating a power storage module 3 and a restraining tool 8.

FIG. 3 is an exploded perspective view illustrating the power storage module 3 and the restraining tool 8. The power storage module 3 includes a plurality of power storage cells 16 and a plurality of current collector plates 17. The power storage cells 16 are placed at intervals in the up-down direction. The current collector plates 17 are each placed between the power storage cells 16. Further, the current collector plates 17 are also placed on the top face 10 and the bottom face 11 of the power storage module 3.

The restraining tool 8 includes a top plate 20, a base plate 21, a plurality of pillars 22, and insulating plates 23, 24. The insulating plate 23 is placed on the top face 10 of the power storage module 3, and the insulating plate 24 is placed on the bottom face 11 of the power storage module 3.

The top plate 20 is placed on a top face of the insulating plate 23, and the base plate 21 is placed on a bottom face of the insulating plate 24. The pillars 22 are provided so as to connect the top plate 20 to the base plate 21. The pillars 22 are placed at intervals along the long side faces 12, 13 of the power storage module 3. Note that the top plate 20, the base plate 21, and the pillars 22 are made of a metallic material.

Upper ends of the pillars 22 are fixed to the top plate 20 by bolts or the like. Bottom ends of the pillars 22 are fixed to the base plate 21 by bolts or the like (not shown). By tightening the bolts, a restraint force is applied to the power storage module 3 placed between the top plate 20 and the base plate 21. Hereby, the power storage cells 16 and the current collector plates 17 laminated in the up-down direction are restricted.

The insulating plate 23 secures an insulating property between the top plate 20 and the power storage module 3, and the insulating plate 24 secures an insulating property between the base plate 21 and the power storage module 3.

Figure 4:
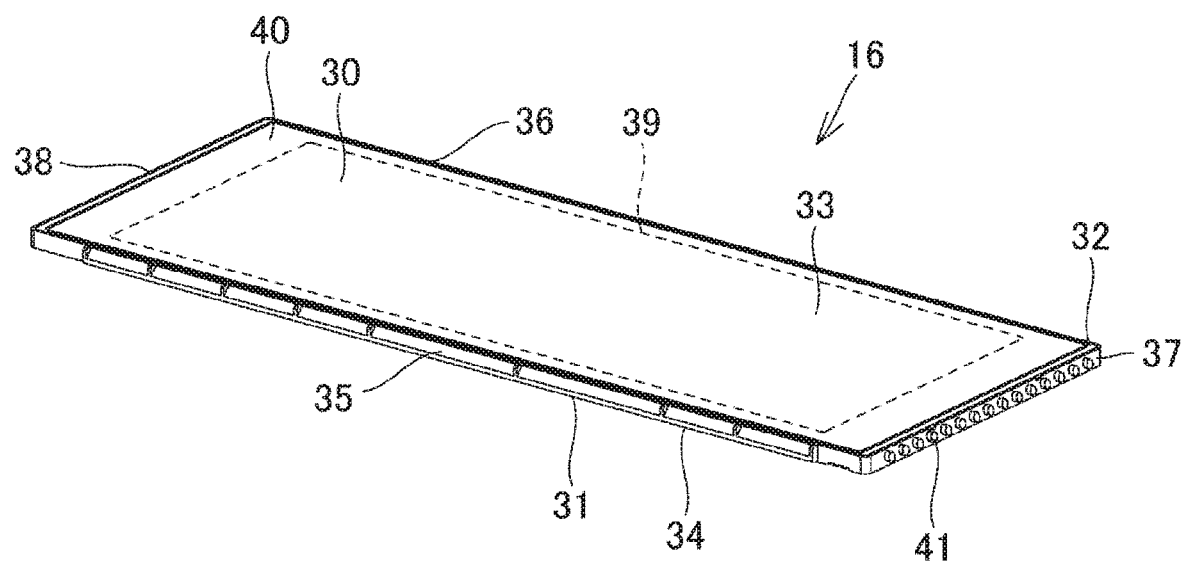
FIG. 4 is a perspective view illustrating a power storage cell 16.

FIG. 4 is a perspective view illustrating the power storage cell 16. The power storage cell 16 includes electrode plates 30, 31, a resin frame 32, and an electrode body 39.

The power storage cell 16 includes a top face 33, a bottom face 34, long side faces 35, 36, and end side faces 37, 38. The electrode plate 30 is placed on the top face 33, and the electrode plate 31 is placed on the bottom face 34. The resin frame 32 is formed in an annular shape, and the long side faces 35, 36 and the end side faces 37, 38 are formed by the resin frame 32.

An accommodation space 40 is formed by the electrode plate 30, the electrode plate 31, and the resin frame 32, and the electrode body 39 is accommodated in the accommodation space 40. Note that an electrolytic solution is also accommodated in the accommodation space 40. Note that the electrode body 39 includes a positive-electrode mixture layer, a negative-electrode mixture layer, and a separator. The positive-electrode mixture layer is made of nickel hydroxide and so on. The negative-electrode mixture layer is made of hydrogen adsorption alloy and so on. The separator is made of, for example, a woven fabric, a non-woven fabric, and so on made of a porous film or the like made of polyolefin resin. The electrolytic solution is an alkaline solution such as potassium hydroxide aqueous solution, for example, and is enclosed in the accommodation space 40. Thus, the power storage cell 16 is configured as a nickel-metal hydride battery (a Ni-MH battery).

The power storage cell 16 includes a plurality of liquid discharge valves 41. In the example illustrated in FIG. 4, the liquid discharge valves 41 are formed on the end side face 37.

Referring back to FIG. 3, each of the current collector plates 17 is made of a metallic material, and the power storage cells 16 are electrically connected in series to each other by the current collector plates 17. Note that the current collector plate 17 positioned at the top face 10 of the power storage module 3 is provided with a collector terminal (not shown), and the current collector plate 17 positioned at the bottom face 11 is also provided with a collector terminal (not shown). Each of the collector terminals is connected to a junction box or the like provided outside the power storage device 2.

Referring back to FIG. 2, the power storage device 2 includes a plurality of cover plates 45, 46, 47, 48. The cover plate 45 is placed on the end side face 14 side. The cover plate 46 is placed on the end side face 15. Similarly, the cover plate 47 is placed on the long side face 12, and the cover plate 48 is placed on the long side face 13.

Figure 5:
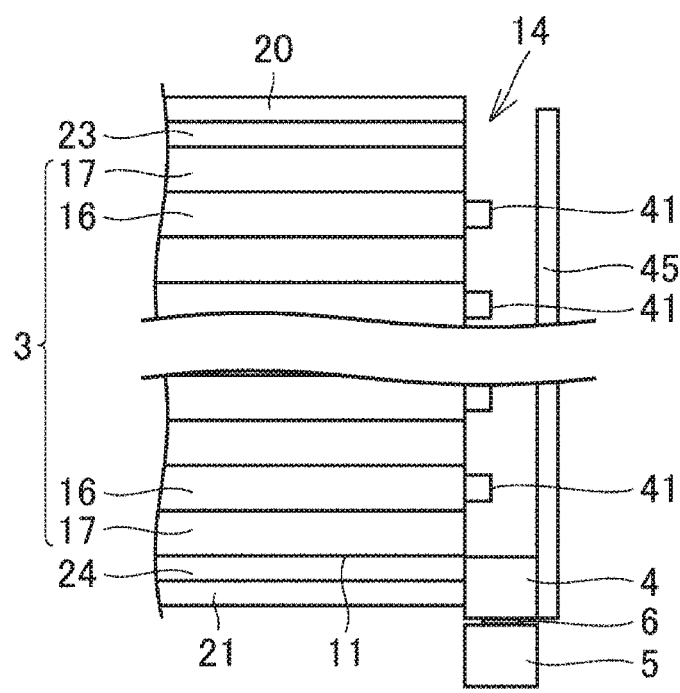
FIG. 5 is a side view schematically illustrating a liquid collection unit 4, an accumulation portion 5, and a cover plate 45.

FIG. 5 is a side view schematically illustrating the liquid collection unit 4, the accumulation portion 5, and the cover plate 45. The liquid collection unit 4 is placed on the end side face 14 side. The liquid collection unit 4 is placed such that a top face of the liquid collection unit 4 is generally flush with the bottom face 11 of the power storage module 3.

The liquid discharge valves 41 are placed on the end side face 14 of the power storage module 3. The cover plate 45 is placed to be distanced from the end side face 14 of the power storage module 3. A lower end portion of the cover plate 45 is connected to the liquid collection unit 4. The accumulation portion 5 is placed below the liquid collection unit 4.

Figure 6:
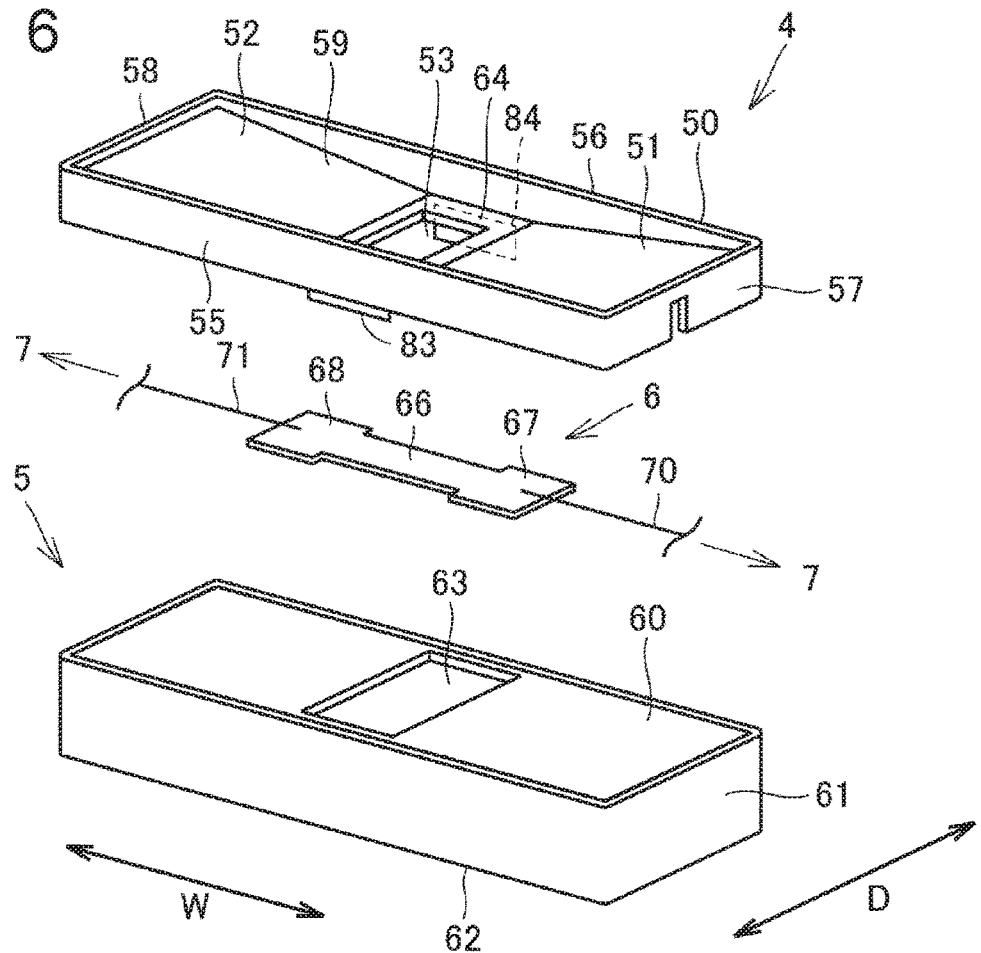
FIG. 6 is a perspective view illustrating the liquid collection unit 4, the accumulation portion 5, and a corrosion portion 6.

FIG. 6 is a perspective view illustrating the liquid collection unit 4, the accumulation portion 5, and the corrosion portion 6. The liquid collection unit 4 includes an outer peripheral wall 50 and an inner wall 59, and a supply port 53 is formed on the inner wall 59.

The outer peripheral wall 50 is formed in an annular shape, and the outer peripheral wall 50 includes a long side wall 55, a long side wall 56, an end side wall 57, and an end side wall 58. The long side wall 55 and the long side wall 56 are formed in an elongated shape in the width direction W, and the end side wall 57 and the end side wall 58 are formed to extend in the front-rear direction D.

The cover plate 45 illustrated in FIG. 5 is connected to the long side wall 56. In some embodiments, the cover plate 45 may be connected to the long side wall 56 such that, among surfaces of the cover plate 45, an inner surface on the power storage module 3 side is flush with an inner surface of the long side wall 56.

The inner wall 59 is placed inside the outer peripheral wall 50, and the supply port 53 is formed in the center of the inner wall 59 in the width direction W.

The inner wall 59 includes an inclined plate 51, a flat plate 64, and an inclined plate 52. The inclined plate 51 is formed to extend from the end side wall 57 toward the end side wall 58, and the inclined plate 51 is inclined to be directed downward as the inclined plate 51 comes close to the end side wall 58. The inclined plate 52 is formed to extend from the end side wall 58 toward the end side wall 57, and the inclined plate 52 is inclined to be directed downward as the inclined plate 52 comes close to the end side wall 57.

The flat plate 64 is formed to connect an end side of the inclined plate 51 on the end side wall 58 side to an end side of the inclined plate 52 on the end side wall 57 side. The flat plate 64 is formed to extend horizontally. The supply port 53 is formed in a central part of the flat plate 64.

An insertion plate 83 and an insertion plate 84 are formed on a bottom face of the flat plate 64. In the front-rear direction D, the supply port 53 is placed between the insertion plate 83 and the insertion plate 84, and the insertion plate 83 and the insertion plate 84 are formed to extend downward.

On this account, a top face of the inclined plate 51 is an inclined surface that is inclined to be directed downward toward the supply port 53, and a top face of the inclined plate 52 is an inclined surface that is inclined to be directed downward toward the supply port 53.

The accumulation portion 5 is formed in a hollow rectangular solid shape. The accumulation portion 5 includes a top plate 60, a peripheral wall 61, and a base plate 62. A receiving port 63 is formed on the top plate 60.

The peripheral wall 61 is formed to extend downward from an outer peripheral edge of the top plate 60, and the peripheral wall 61 is formed so as to extend in an annular shape. Note that the base plate 62 is connected to a lower edge of the peripheral wall 61.

The corrosion portion 6 includes a thin wiring line 66 and terminals 67, 68. The terminal 67 and the terminal 68 are formed in opposite ends of the thin wiring line 66. A width of the thin wiring line 66 in the front-rear direction D is formed to be shorter than widths of the terminals 67, 68.

A wiring line 70 is connected to the terminal 67, and a wiring line 71 is connected to the terminal 68. The wiring line 70 and the wiring line 71 are connected to the detection portion 7 illustrated in FIG. 2.

The corrosion portion 6 is placed between the liquid collection unit 4 and the accumulation portion 5, and a part of the corrosion portion 6 is placed to be positioned below the supply port 53 but above the receiving port 63. More specifically, the terminal 67 and the terminal 68 are placed on a top face of the top plate 60. A part of the thin wiring line 66 is placed below the supply port 53 but above the receiving port 63.

Here, currents flow through the wiring line 70 and the wiring line 71, and the detection portion 7 can detect the currents flowing through the wiring lines 70, 71. Note that the detection portion 7 may be configured to detect voltages applied to the wiring lines 70, 71. The detection portion 7 transmits a detection result to the ECU 18.

Figure 7:
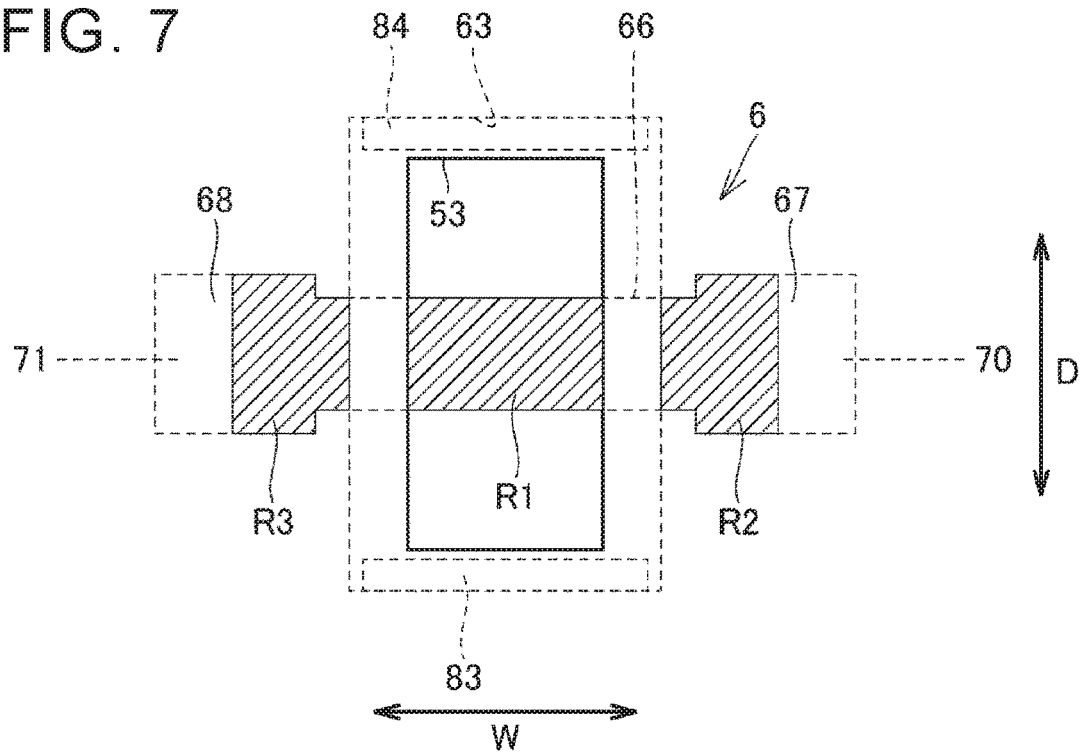
FIG. 7 is a plan view illustrating a supply port 53, a receiving port 63, and the corrosion portion 6.

FIG. 7 is a plan view illustrating the supply port 53, the receiving port 63, and the corrosion portion 6. Referring now to FIGS. 6 and 7, in the width direction W, a length of the receiving port 63 is formed to become longer than a length of the supply port 53.

Note that, in the example illustrated in the present embodiment, in the front-rear direction D, a length of the receiving port 63 is longer than a length of the supply port 53.

The corrosion portion 6 is sandwiched between the liquid collection unit 4 and the accumulation portion 5 such that the corrosion portion 6 is held by the liquid collection unit 4 and the accumulation portion 5.

When the supply port 53 and the corrosion portion 6 are planarly viewed from above the supply port 53, a corrosion part R1 that is a part of the thin wiring line 66 is positioned inside the supply port 53.

A holding part R2 constituted by a part of the terminal 67 and a part of the thin wiring line 66 is held by the liquid collection unit 4 and the accumulation portion 5. More specifically, the holding part R2 is sandwiched between the flat plate 64 of the liquid collection unit 4 and the top plate 60 of the accumulation portion 5.

A holding part R3 constituted by a part of the terminal 68 and a part of the thin wiring line 66 is held by the liquid collection unit 4 and the accumulation portion 5. More specifically, the holding part R3 is sandwiched between the flat plate 65 of the liquid collection unit 4 and the top plate 60 of the accumulation portion 5.

Here, the corrosion part R1 is positioned between the holding part R2 and the holding part R3. Further more specifically, the holding part R2 is positioned on a side opposite to the holding part R3 across the corrosion part R1.

Note that the wiring line 70 is connected to a part of the terminal 67, the part being not sandwiched between the liquid collection unit 4 and the accumulation portion 5. The wiring line 71 is connected to a part of the terminal 68, the part being not sandwiched between the liquid collection unit 4 and the accumulation portion 5.

Note that the corrosion portion 6 is made of a metallic material such as aluminum, and the corrosion portion 6 is corroded by the electrolytic solution.

The insertion plate 83 and the insertion plate 84 are inserted into the receiving port 63, so that the liquid collection unit 4 and the accumulation portion 5 are positioned by the insertion plate 83 and the insertion plate 84.

In the power storage device 2 configured as described above, an internal pressure in the power storage cell 16 illustrated in FIG. 5 may increase in some cases. When the internal pressure in the power storage cell 16 reaches a predetermined value or more, the liquid discharge valves 41 are opened. When the liquid discharge valves 41 are opened, gas inside the power storage cell 16 gushes out. At this time, the electrolytic solution inside the power storage cell 16 also gushes out together with the gas.

Since the cover plate 45 is provided on the end side face 14, the electrolytic solution thus gushing out from the liquid discharge valves 41 is sprayed the an inner surface of the cover plate 45. The electrolytic solution thus sprayed on the cover plate 45 falls downward along the inner surface of the cover plate 45.

In FIG. 6, the electrolytic solution falling downward along the inner surface of the cover plate 45 enters the liquid collection unit 4 along the inner surface of the long side wall 56.

For example, the electrolytic solution reaches the top face of the inclined plate 51 or the top face of the inclined plate 52. Since the top faces of the inclined plates 51, 52 are formed to be inclined toward the supply port 53, the electrolytic solution that has reached the inclined plates 51, 52 flows toward the supply port 53. The electrolytic solution that has reached the supply port 53 drops downward through the supply port 53. The electrolytic solution thus dropping downward through the supply port 53 enters the accumulation portion 5 from the receiving port 63.

As such, the liquid collection unit 4 collects the electrolytic solution gushing out from the liquid discharge valves 41 and supplies the electrolytic solution to the accumulation portion 5. The top faces of the inclined plate 51 and the inclined plate 52 of the liquid collection unit 4 are inclined surfaces that are inclined toward the supply port 53, and the electrolytic solution thus entering the liquid collection unit 4 flows into the supply port 53 appropriately.

A passage route along which the electrolytic solution gushing out from the liquid discharge valves 41 reaches the accumulation portion 5 is a route mainly passing the inner surface of the cover plate 45, the inner surface of the long side wall 56, the top faces (inclined surfaces) of the inclined plates 51, 52, the supply port 53, and the receiving port 63 sequentially.

The corrosion portion 6 is placed between the supply port 53 and the receiving port 63, and the corrosion portion 6 is positioned inside the passage route for the electrolytic solution.

On that account, when the electrolytic solution gushes out from the liquid discharge valves 41, the electrolytic solution is attached to the corrosion portion 6. When the electrolytic solution is attached to the corrosion portion 6, the corrosion portion 6 corrodes. When the electrolytic solution continuously gushes out from the liquid discharge valves 41, the corrosion of the corrosion portion 6 progresses, so that the corrosion portion 6 breaks.

When the corrosion portion 6 breaks, electrical connection between the wiring line 70 and the wiring line 71 is disconnected. The detection portion 7 detects currents flowing through or voltages applied to the wiring line 70 and the wiring line 71, and the detection portion 7 transmits a detection result to the ECU 18 illustrated in FIG. 1. When the ECU 18 determines that the corrosion portion 6 breaks, absolute values of Win and Wout of the power storage device 2 are set to be small, for example. Further, the ECU 18 performs, for example, displaying on the notification portion 19 illustrated in FIG. 1 so as to notify a driver that the use of the power storage device 2 is restricted.

As such, with the use of the power storage device 2 according to the present embodiment, when the electrolytic solution leaks out from the liquid discharge valves 41 of the power storage device 2, the power storage device 2 can detect the leakage of the electrolytic solution by the detection portion 7.

In FIG. 7, when the supply port 53 and the corrosion portion 6 are planarly viewed from above the supply port 53, the corrosion part R1 is positioned inside the supply port 53. An area of the corrosion part R1 is smaller than an aperture area of the supply port 53.

On this account, when the electrolytic solution is attached to the corrosion part R1 and the corrosion part R1 corrodes, breakage easily occurs in the corrosion part R1. Hereby, when the electrolytic solution leaks out from the liquid discharge valves 41, the detection portion 7 can detect the breakage of the corrosion portion 6 at an early stage.

In FIG. 7, since an aperture area of the receiving port 63 is larger than the aperture area of the supply port 53, the electrolytic solution discharged from the supply port 53 is easily received by the receiving port 63. Hereby, it is possible to restrain the electrolytic solution from leaking outside. Note that, when the supply port 53 and the receiving port 63 are planarly viewed from above the receiving port 63, the supply port 53 is positioned inside the receiving port 63. Because of this, the electrolytic solution easily enters the receiving port 63 appropriately, so that leakage of the electrolytic solution is restrained.

Note that, since the insertion plate 83 and the insertion plate 84 are inserted into the receiving port 63, the electrolytic solution flowing from the supply port 53 to the receiving port 63 is restrained from leaking outside through between the liquid collection unit 4 and the accumulation portion 5.

Embodiment 2

Figure 8:
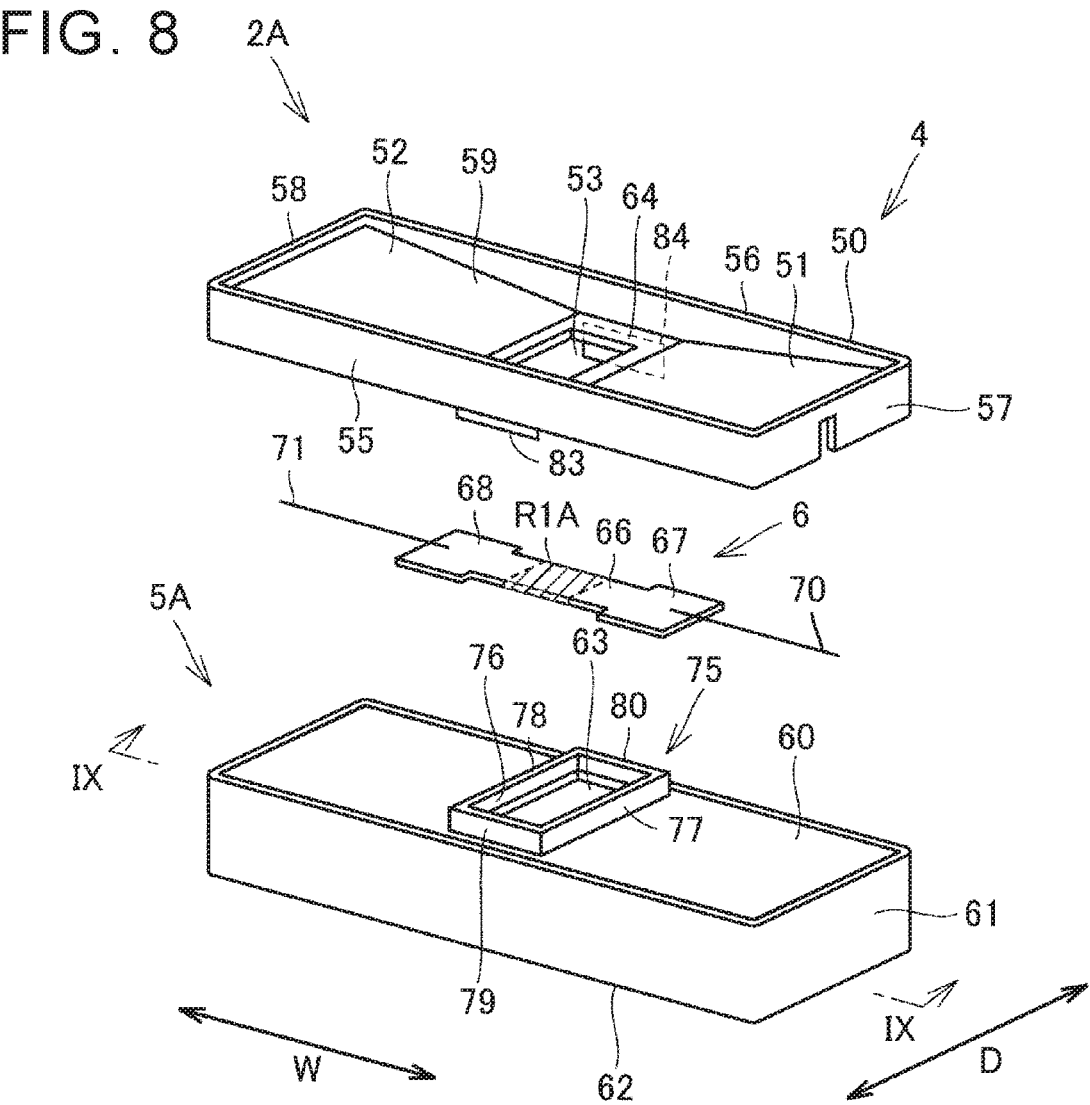
FIG. 8 is a perspective view illustrating the liquid collection unit 4 and an accumulation portion 5A of a power storage device 2A.

With reference to FIG. 8 and so on, the following describes a power storage device 2A according to Embodiment 2. Note that the power storage device 2A is formed to have substantially the same configuration as the power storage device 2 except the structure of the accumulation portion 5.

FIG. 8 is a perspective view illustrating the liquid collection unit 4 and an accumulation portion 5A of the power storage device 2A. As illustrated in FIG. 8, the accumulation portion 5A includes a projection portion 75 formed on the top plate 60.

The projection portion 75 is formed to project upward from the top face of the top plate 60, and the projection portion 75 is formed in a tubular shape. A passage 76 is formed inside the projection portion 75, and the receiving port 63 is formed on an upper end surface of the projection portion 75. Note that the receiving port 63 is positioned at an upper end of the passage 76, and the passage 76 communicates with the inside of the accumulation portion 5.

The projection portion 75 includes a plurality of side walls 77, 78, 79, 80 placed in an annular shape. The side wall 77 and the side wall 78 are placed at an interval in the width direction W, and the side wall 79 and the side wall 80 are placed at an interval in the front-rear direction D.

The corrosion portion 6 is placed on the projection portion 75. More specifically, the corrosion portion 6 is placed over the side wall 77 and the side wall 78. Also in the power storage device 2A, the corrosion portion 6 is placed below the supply port 53 but above the receiving port 63.

Note that, in Embodiment 2, a corrosion part R1A of the corrosion portion 6 is positioned below the supply port 53.

Figure 9:
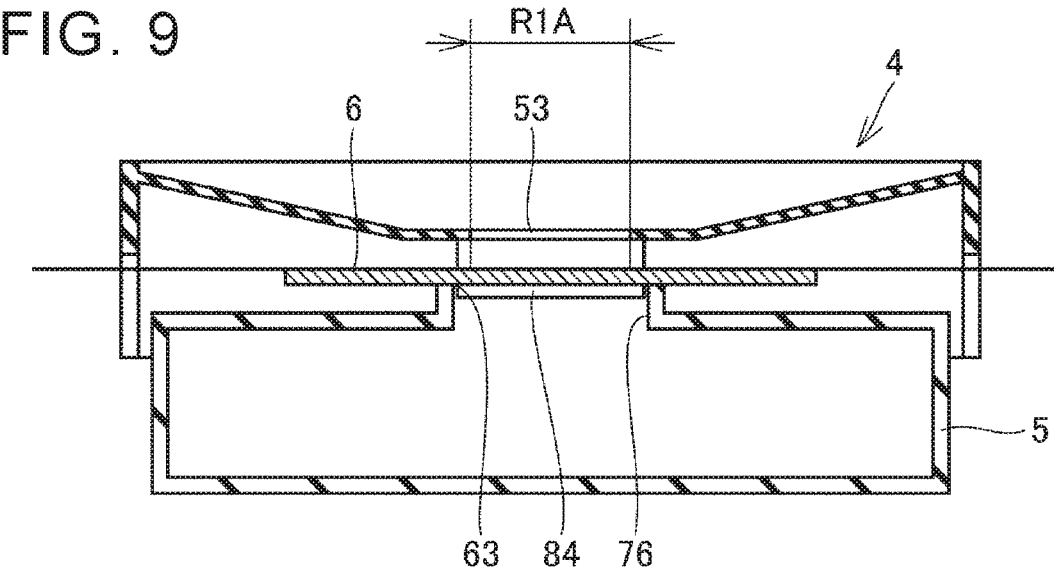
FIG. 9 is a sectional view taken along a line IX-IX in FIG. 8.

FIG. 9 is a sectional view taken along a line IX-IX in FIG. 8. As illustrated in FIG. 9, in the power storage device 2A, the corrosion portion 6 is not sandwiched between the liquid collection unit 4 and the accumulation portion 5A.

When the electrolytic solution flows from the supply port 53 toward the receiving port 63, at least part of the electrolytic solution passes through the corrosion part R1A. Hereby, the corrosion part R1A corrodes, so that the corrosion portion 6 breaks.

Figure 10:
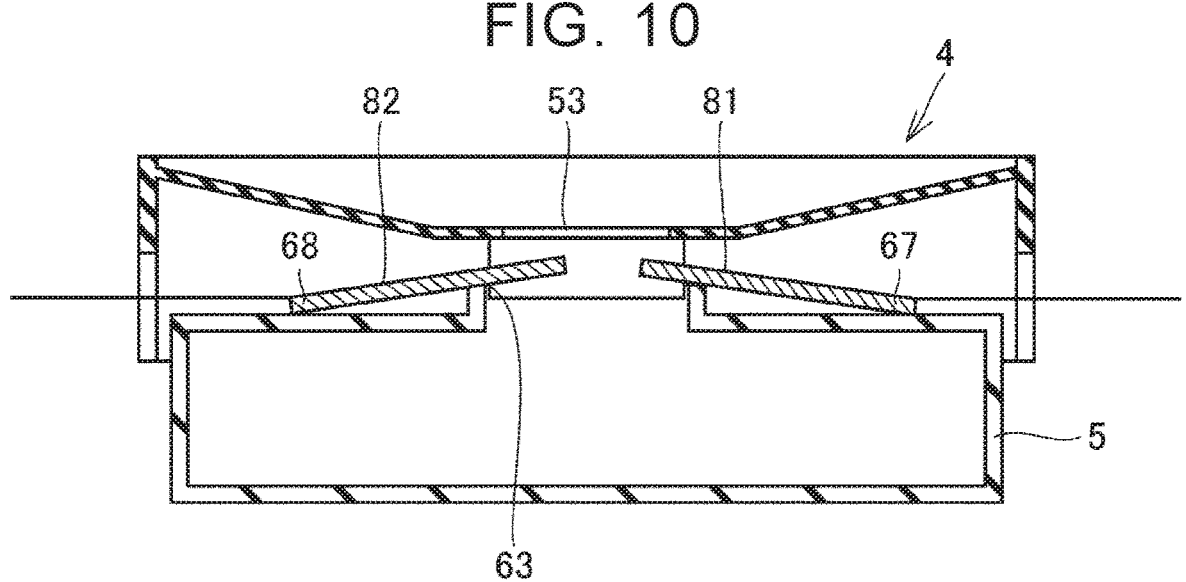
FIG. 10 is a sectional view illustrating a state where the corrosion portion 6 breaks.

FIG. 10 is a sectional view illustrating a state where the corrosion portion 6 has broken. When the corrosion portion 6 breaks at the corrosion part R1A, the corrosion portion 6 is divided into a broken piece 81 and a broken piece 82.

Here, since the mass of the terminal 67 is large, the broken piece 81 is inclined so that a broken end of the broken piece 81 is directed upward. Similarly, since the mass of the terminal 68 is large, the broken piece 82 is inclined so that a broken end of the broken piece 82 is directed upward.

As such, when the corrosion portion 6 breaks, the broken end of the broken piece 81 and the broken end of the broken piece 82 move so as to be separated from the receiving port 63.

Here, it is assumed that respective broken ends of the broken pieces 81, 82 enter the receiving port 63, and the broken ends make contact with the electrolytic solution. At this time, since the electrolytic solution is made of a conductive material, the broken piece 81 and the broken piece 82 may be electrically conductive with each other through the electrolytic solution.

When the broken piece 81 and the broken piece 82 are electrically conductive with each other as such, the detection portion 7 cannot detect the breakage of the corrosion portion 6.

In the meantime, in the power storage device 2A, the broken ends of the broken pieces 81, 82 are restrained from entering the accumulation portion 5, and therefore, it is possible to restrain the occurrence of an adverse effect as described above.

Note that, in Embodiment 2, the corrosion portion 6 is not sandwiched between the liquid collection unit 4 and the accumulation portion 5A, and therefore, the corrosion portion 6 is not held by the liquid collection unit 4 and the accumulation portion 5A. In the meantime, in the power storage device 2A, the corrosion portion 6 may be sandwiched between the liquid collection unit 4 and the accumulation portion 5A so that the corrosion portion 6 is held by the liquid collection unit 4 and the accumulation portion 5A.

Embodiment 3

Figure 11:
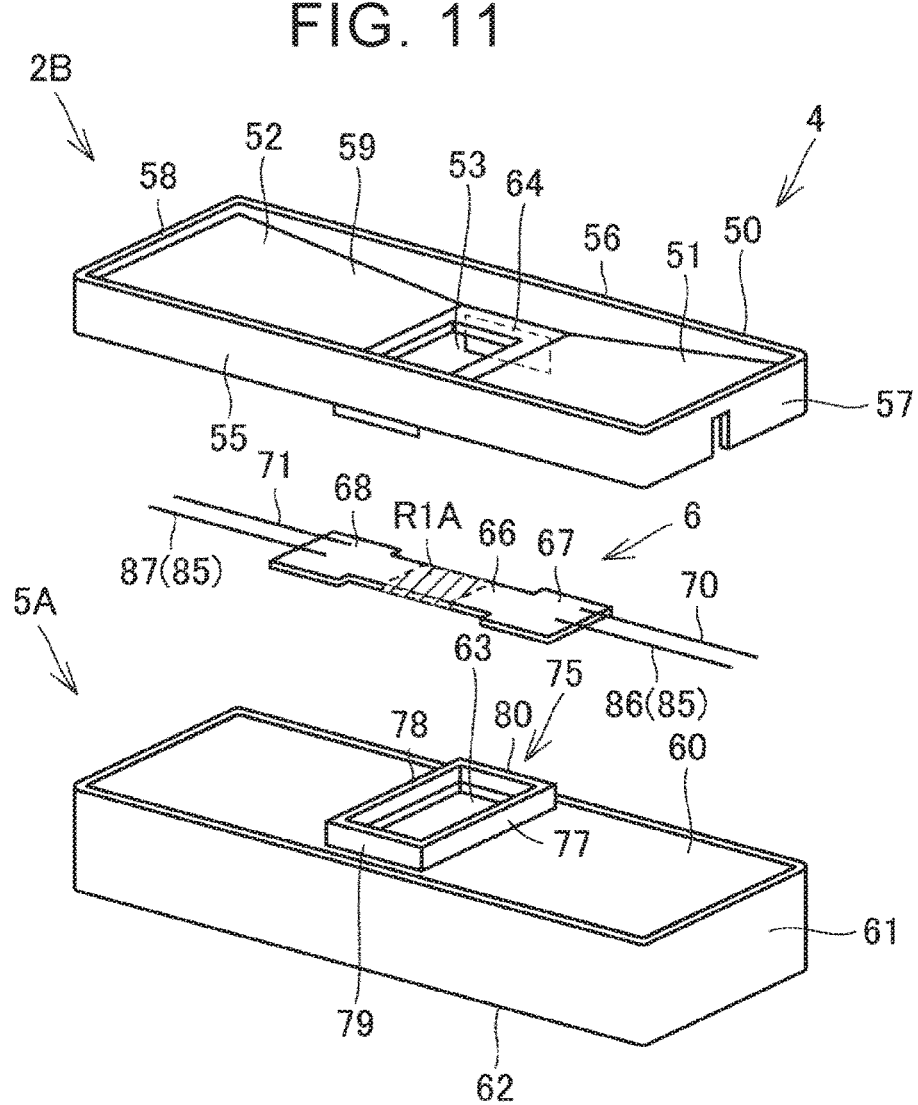
FIG. 11 is an exploded perspective view illustrating the liquid collection unit 4, the accumulation portion 5A, and the corrosion portion 6 in a power storage device 2B.

With reference to FIG. 11 and so on, the following describes a power storage device 2B according to Embodiment 3. FIG. 11 is an exploded perspective view illustrating the liquid collection unit 4, the accumulation portion 5A, and the corrosion portion 6 in the power storage device 2B. In the power storage device 2B, the corrosion portion 6 is also placed on the top plate 60 of the accumulation portion 5A.

In the power storage device 2B, the corrosion portion 6 is not held by the liquid collection unit 4 and the accumulation portion 5A. The power storage device 2B includes a tension device 85 configured to apply tensile forces to the corrosion portion 6.

The tension device 85 includes a tension wire 86 and a tension wire 87. The tension wire 86 is connected to the terminal 67, and the tension wire 87 is connected to the terminal 68.

Note that the terminal 67 is positioned at a position distanced from the corrosion part R1A in the width direction W, and the terminal 68 is positioned on a side opposite to the terminal 67 across the corrosion part R1A. Thus, the terminal 67 functions as a "first tension part", and the terminal 68 functions as a "second tension part."

The tension wire 86 and the tension wire 87 apply tensile forces to the corrosion portion 6 so that the terminal 67 and the terminal 68 are separated from each other.

Figure 12:
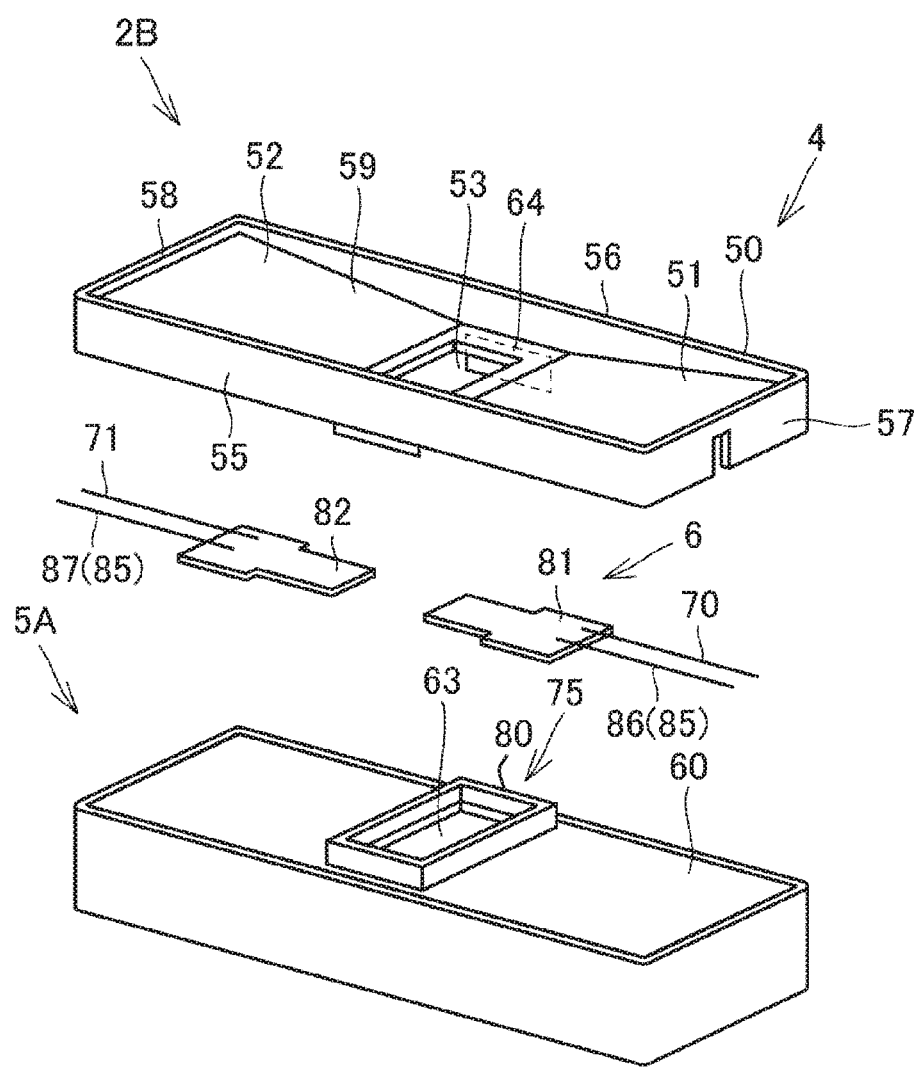
FIG. 12 is an exploded perspective view illustrating the liquid collection unit 4, the accumulation portion 5A, and the corrosion portion 6 in a state where the corrosion portion 6 breaks.

FIG. 12 is an exploded perspective view illustrating the liquid collection unit 4, the accumulation portion 5A, and the corrosion portion 6 in a state where the corrosion portion 6 breaks.

When the corrosion part R1A of the corrosion portion 6 corrodes and the corrosion portion 6 breaks, the broken piece 81 is pulled by the tension wire 86, and the broken piece 82 is pulled by the tension wire 87.

When the corrosion portion 6 breaks, the broken piece 81 and the broken piece 82 are distanced from the receiving port 63, thereby making it possible to restrain the broken piece 81 and the broken piece 82 from entering the accumulation portion 5A. Hereby, it is possible to restrain the broken piece 81 and the broken piece 82 from being electrically conductive with each other via the electrolytic solution after the corrosion portion 6 breaks, so that the detection portion 7 can detect the breakage of the corrosion portion 6.

Note that, in Embodiment 3 described above, the corrosion portion 6 is not sandwiched between the liquid collection unit 4 and the accumulation portion 5A, so that the corrosion portion 6 is not held by the liquid collection unit 4 and the accumulation portion 5A. In the meantime, in the power storage device 2B, the corrosion portion 6 may be sandwiched between the liquid collection unit 4 and the accumulation portion 5A so that the corrosion portion 6 is held by the liquid collection unit 4 and the accumulation portion 5A.

Embodiment 4

Figure 13:
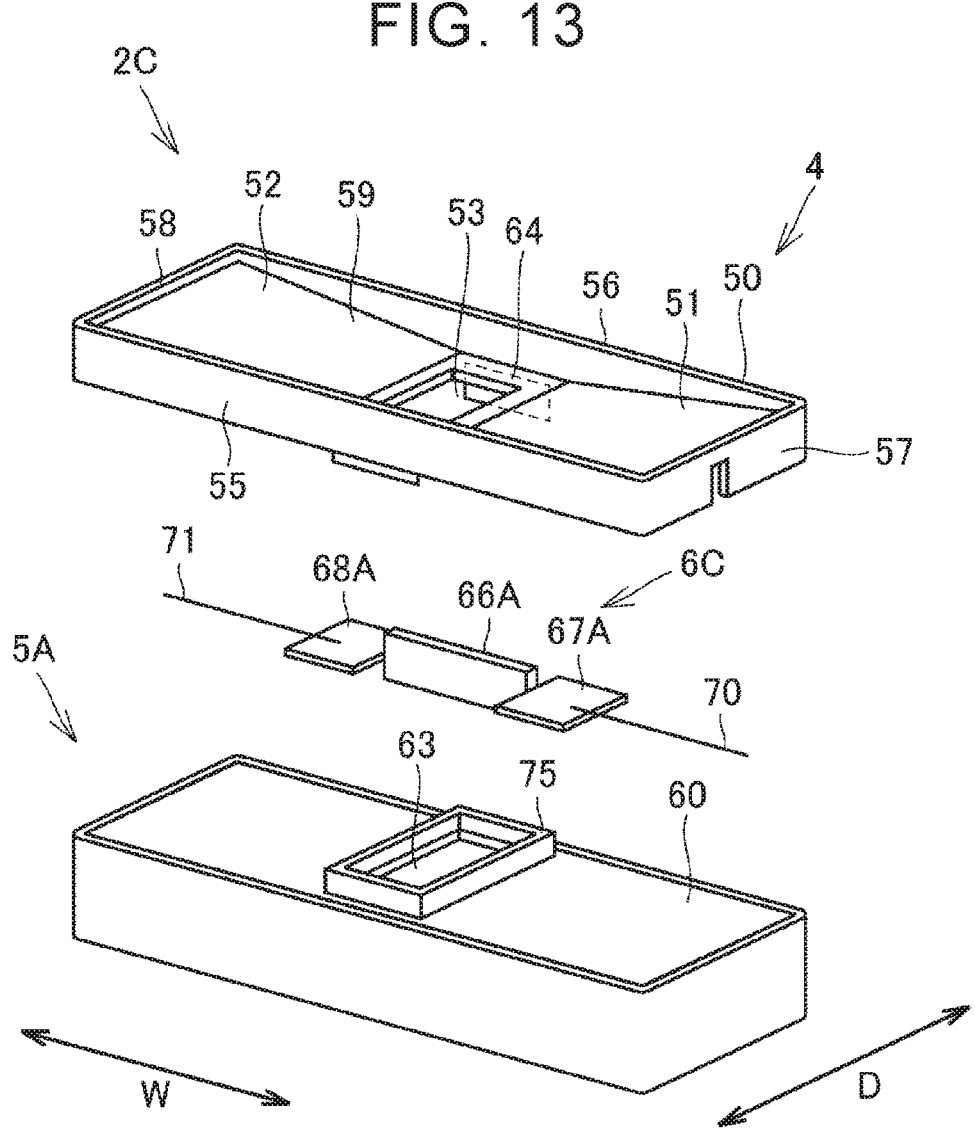
FIG. 13 is a perspective view schematically illustrating the liquid collection unit 4, the accumulation portion 5A, and a corrosion portion 6C in a power storage device 2C.

With reference to FIG. 13, the following describes a power storage device 2C according to Embodiment 4. FIG. 13 is a perspective view schematically illustrating the liquid collection unit 4, the accumulation portion 5A, and a corrosion portion 6C in the power storage device 2C. The configuration of the power storage device 2C is substantially similar to the configuration of the power storage device 2A according to Embodiment 2 except the corrosion portion.

The power storage device 2C includes the liquid collection unit 4, the accumulation portion 5A, and the corrosion portion 6C. The corrosion portion 6C includes terminals 67A, 68A and a thin wiring line 66A. The terminals 67A, 68A are formed in end portions of the thin wiring line 66A.

Figure 14:
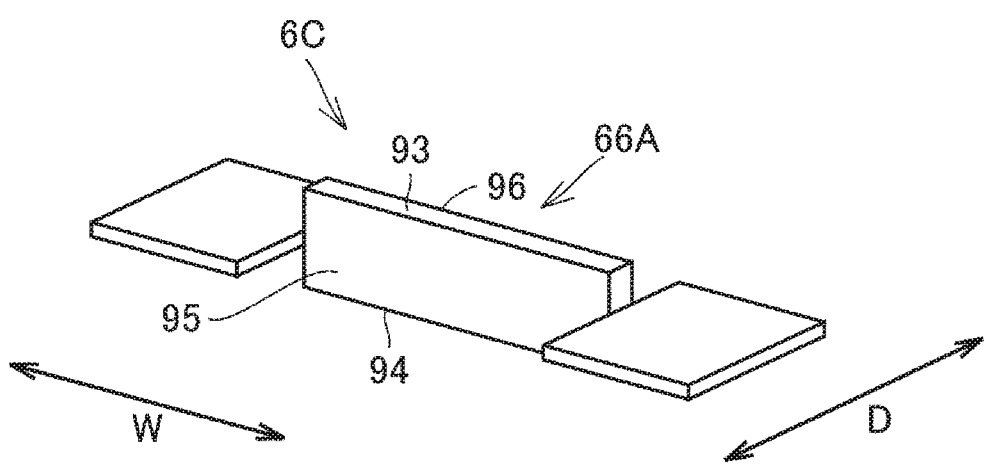
FIG. 14 is a perspective view schematically illustrating the corrosion portion 6C.

The terminal 67A and the terminal 68A are formed in a flat shape and are placed along the top plate 60. A first end of the thin wiring line 66A is connected to the terminal 67A, and a second end of the thin wiring line 66A is connected to the terminal 68B. The thin wiring line 66A is formed to be elongated in the width direction W. FIG. 14 is a perspective view schematically illustrating the corrosion portion 6C. The thin wiring line 66A includes a top face 93, a bottom face 94, a side face 95, and a side face 96.

Figure 15:
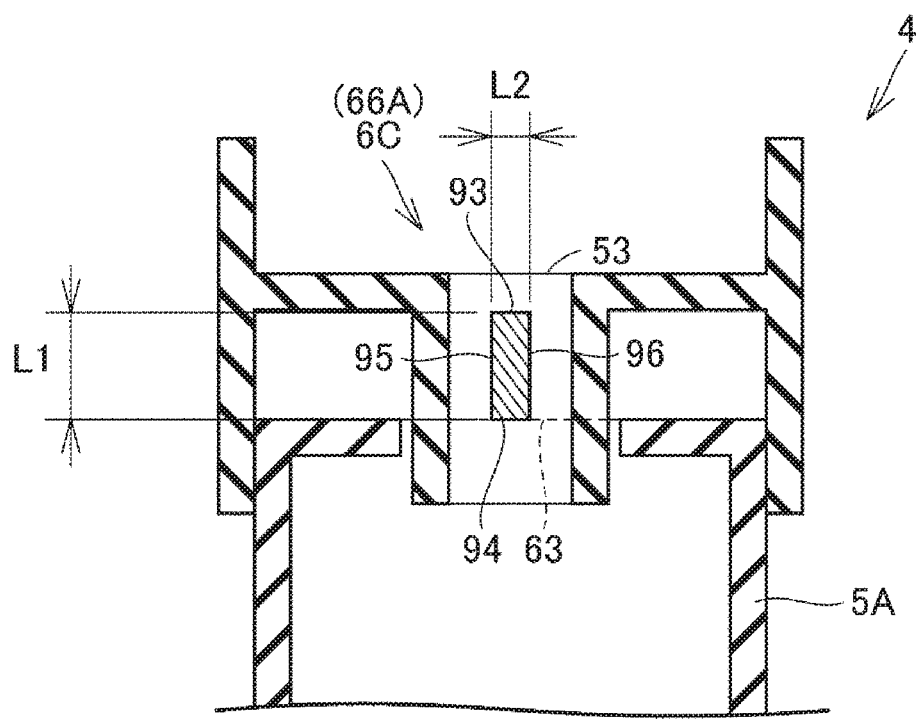
FIG. 15 is a sectional view illustrating a configuration of a thin wiring line 66A and its vicinal area.

FIG. 15 is a sectional view illustrating a configuration of the thin wiring line 66A and its vicinal area. Note that FIG. 15 is a sectional view when the thin wiring line 66A is viewed on a section perpendicular to a direction (the width direction W) where the thin wiring line 66A extends.

A height L1 of the thin wiring line 66A in the up-down direction is longer than a width L2 of a wall portion 92 in the front-rear direction D.

Here, in the course where the electrolytic solution falls down from the supply port 53 of the liquid collection unit 4 toward the receiving port 63 of the accumulation portion 5A, the electrolytic solution is attached to a surface of the wall portion 92.

At this time, the width L2 of the wall portion 92 is shorter than the height L1, so the electrolytic solution is hard to be accumulated on the top face 93. On that account, the electrolytic solution drops downward along surfaces of the side face 95 and the side face 96 of the corrosion portion 6.

When the electrolytic solution continuously falls downward along the side faces 95, 96, the corrosion portion 6C breaks. That is, when the electrolytic solution continuously gushes out from the liquid discharge valves 41, the corrosion portion 6C is disconnected. As a result, in a case where the electrolytic solution temporarily gushes out from the liquid discharge valves 41, disconnection of the corrosion portion 6C is restrained. Thus, with the use of the power storage device 2C, it is possible to detect a state where the electrolytic solution continuously leaks out. Note that, in each of the above embodiments, the liquid discharge valves 41 are provided only on the end side face 14 of the power storage device, but the liquid discharge valves 41 may be provided on the long side faces 12, 13 or the end side face 15. In this case, the liquid collection unit 4 and the accumulation portion 5 are placed on a side face on which the liquid discharge valves 41 are provided.

It should be considered that the embodiments described herein are just examples in all respects and are not limitative. The scope of the disclosure is shown by Claims, not by the descriptions of the above embodiments, and is intended to include every modification made within the meaning and scope equivalent to Claims.

What is claimed is:

1. A power storage device comprising:
a power storage module in which an electrolytic solution is accommodated, the power storage module including a top face, a bottom face, and a plurality of side faces provided such that the side faces connect the top face to the bottom face;

a liquid discharge valve provided on at least one of the side faces;

a liquid collection unit configured to collect the electrolytic solution discharged from the liquid discharge valve;

an accumulation portion in which the electrolytic solution collected by the liquid collection unit is accumulated;

a corrosion portion configured to at least partially corrode due to the electrolytic solution; and a detection portion configured to detect breakage of the corrosion portion, wherein the corrosion portion is placed in a passage route along which the electrolytic solution collected by the liquid collection unit reaches the accumulation portion.

2. The power storage device according to claim 1, further comprising a holding portion configured to hold the corrosion portion, wherein the holding portion includes a first holding part and a second holding part, the first holding part being distanced from a corrosion part of the corrosion portion, the corrosion part being configured to corrode due to the electrolytic solution, the second holding part being positioned on a side opposite to the first holding part across the corrosion part.

3. The power storage device according to claim 1, wherein:

the accumulation portion is placed below the liquid collection unit; and the corrosion portion is sandwiched between the accumulation portion and the liquid collection unit.

4. The power storage device according to claim 1, further comprising a tension device configured to pull the corrosion portion, wherein:

the corrosion portion includes a corrosion part configured to corrode due to the electrolytic solution, a first tension part positioned at a position distanced from the corrosion part, and a second tension part positioned on a side opposite to the first tension part across the corrosion part; and the tension device is configured to apply tensile forces to the corrosion portion so that the first tension part and the second tension part are separated from each other.

5. The power storage device according to claim 1, wherein:

the accumulation portion is placed below the liquid collection unit;

the liquid collection unit has a supply port via which the collected electrolytic solution is supplied to the accumulation portion;

the accumulation portion includes a hollow projection portion projecting upward and having the supply port; and the corrosion portion is placed on the projection portion.

6. The power storage device according to claim 1, wherein:

the accumulation portion is placed below the liquid collection unit;

the liquid collection unit has a supply port via which the collected electrolytic solution is supplied to the accumulation portion;

the corrosion portion is placed below the supply port; and when the supply port and the corrosion portion are viewed from above the supply port, an area of a part of the corrosion portion, the part being positioned inside the supply port, is smaller than an aperture area of the supply port.

7. The power storage device according to claim 1, wherein:

the accumulation portion is placed below the liquid collection unit;

the liquid collection unit has a supply port via which the collected electrolytic solution is supplied to the accumulation portion; and the liquid collection unit includes an inclined surface formed to be inclined such that the inclined surface is directed downward toward the supply port.

8. The power storage device according to claim 6, wherein:

the accumulation portion has a receiving port positioned below the supply port, the receiving port being formed in a part of the accumulation portion, the part being configured to receive the electrolytic solution supplied from the supply port; and an aperture area of the receiving port is larger than an aperture area of the supply port.

* * * * *